(12) United States Patent
T P et al.

(10) Patent No.: US 9,820,625 B2
(45) Date of Patent: Nov. 21, 2017

(54) ROBOT CLEANER

(71) Applicant: LG ELECTRONICS INC., Seoul (KR)

(72) Inventors: Divya T P, Seoul (KR); Sumit Gautam, Seoul (KR); Dharshan Kumar, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 14/593,572

(22) Filed: Jan. 9, 2015

(65) Prior Publication Data
US 2015/0250372 A1    Sep. 10, 2015

(30) Foreign Application Priority Data
Mar. 5, 2014    (KR) .................. 10-2014-0025880

(51) Int. Cl.
| | |
|---|---|
| *A47L 11/00* | (2006.01) |
| *A47L 11/40* | (2006.01) |
| *A47L 9/28* | (2006.01) |
| *G05D 1/02* | (2006.01) |

(52) U.S. Cl.
CPC ......... *A47L 11/4011* (2013.01); *A47L 9/2826* (2013.01); *G05D 1/028* (2013.01); *G05D 1/0274* (2013.01); *A47L 2201/04* (2013.01); *A47L 2201/06* (2013.01); *G05D 2201/0203* (2013.01)

(58) Field of Classification Search
CPC . A47L 11/4011; A47L 9/2826; G05D 1/0275; G05D 1/028
See application file for complete search history.

(56) References Cited

U.S. PATENT DOCUMENTS

| | | | |
|---|---|---|---|
| 7,780,796 B2 * | 8/2010 | Shim ..................... | A47L 9/2805 134/56 R |
| 8,606,404 B1 * | 12/2013 | Huffman ................ | B25J 9/1697 700/259 |
| 8,843,245 B2 * | 9/2014 | Choe .................... | G05D 1/0246 700/214 |
| 8,972,061 B2 * | 3/2015 | Rosenstein ........... | A47L 9/2852 700/259 |
| 9,298,183 B2 * | 3/2016 | Artes .................... | G05D 1/0022 |
| 9,408,515 B2 * | 8/2016 | Rosenstein ........... | A47L 9/2852 |
| 2005/0162119 A1 * | 7/2005 | Landry ................. | A47L 9/2805 318/580 |

(Continued)

FOREIGN PATENT DOCUMENTS

| | | |
|---|---|---|
| CN | 104414590 A | 3/2015 |
| JP | 2007-029490 A | 2/2007 |

(Continued)

*Primary Examiner* — Thomas G Black
*Assistant Examiner* — Peter D Nolan
(74) *Attorney, Agent, or Firm* — Dentons US LLP (57) ABSTRACT

A robot cleaner includes a main body, a moving device to move the main body, and a control unit at the main body to recognize an area requiring cleaning. When the control unit recognizes the area requiring cleaning while in a standby state of the robot cleaner, the control unit controls the moving device so that the main body moves from a standby position to the area requiring cleaning to clean the area based on the control unit recognizing the area requiring cleaning.

14 Claims, 6 Drawing Sheets

(56) References Cited

U.S. PATENT DOCUMENTS

| | | | |
|---|---|---|---|
| 2005/0218852 A1* | 10/2005 | Landry | A47L 9/2805 318/580 |
| 2006/0237158 A1* | 10/2006 | Shim | A47L 9/2805 164/18 |
| 2007/0244610 A1* | 10/2007 | Ozick | A47L 5/30 701/23 |
| 2009/0319083 A1* | 12/2009 | Jones | A47L 9/009 700/259 |
| 2011/0264305 A1* | 10/2011 | Choe | G05D 1/0246 701/2 |
| 2012/0103367 A1* | 5/2012 | Tang | G05D 1/0246 134/18 |
| 2012/0173070 A1* | 7/2012 | Schnittman | G05D 1/0227 701/26 |
| 2012/0232697 A1* | 9/2012 | Lee | G05D 1/0246 700/259 |
| 2014/0124004 A1* | 5/2014 | Rosenstein | A47L 9/2852 134/18 |
| 2014/0152835 A1* | 6/2014 | Chen | H04L 12/6418 348/158 |
| 2015/0000068 A1* | 1/2015 | Tsuboi | A47L 9/009 15/319 |
| 2015/0148951 A1* | 5/2015 | Jeon | G05D 1/0219 700/248 |
| 2016/0313741 A1* | 10/2016 | Lindhe | G05D 1/0248 |

FOREIGN PATENT DOCUMENTS

| | | | |
|---|---|---|---|
| JP | 2013-169221 A | | 9/2013 |
| KR | 10-2000-0002308 A | | 1/2000 |
| KR | 10-2013-0092729 A | | 8/2013 |
| RU | 2311868 C1 | | 12/2007 |

* cited by examiner

ROBOT CLEANER

CROSS-REFERENCE TO RELATED APPLICATIONS

The present application claims priority under 35 U.S.C. 119 and 35 U.S.C. 365 to Korean Patent Application No. 10-2014-0025880 (filed on Mar. 5, 2014), which is hereby incorporated by reference in its entirety.

BACKGROUND

The present disclosure relates to a robot cleaner.

A robot cleaner is a kind of home appliance, which cleans a predetermined area by suctioning the surrounding dusts or foreign substances while self-traveling on the predetermined area.

A robot cleaner and a method of controlling thereof are disclosed in Korean Patent Publication No. 10-2011-0053767 (Publication Date: May 24, 2011) which is incorporated by reference in its entirety.

The disclosed robot cleaner includes a travel unit traveling on a cleaning area when a traveling mode command is inputted; a detection unit detecting an object disposed within the cleaning area while traveling by the traveling mode command; and a control unit drawing up a cleaning map with respect to the cleaning area on the basis of location information of the object when the detected object is an obstacle and controlling a cleaning operation on the basis of the drawn cleaning map when a cleaning mode command is inputted.

The robot cleaner according to the related art performs a traveling operation to clean the predetermined area when the traveling mode command for cleaning is inputted by a user. When the obstacle is detected during the traveling operation, the robot cleaner performs the cleaning while avoiding the obstacle.

Thus, according to the related art, the robot cleaner does not perform the cleaning unless the user inputs the traveling mode command. For example, even though water or beverage is spilled on the floor, or the floor is dusty, the robot cleaner does not perform the traveling operation unless the traveling mode command is inputted, and thus the floor is not cleaned.

Also, the robot cleaner performs the cleaning by only avoiding a simple obstacle when traveling, and the robot cleaner does not determine an area on which the cleaning is restricted. For example, since the robot cleaner generates noises while traveling, when the user is sleeping or in a meeting, the noises may disturb the user's sleep or meeting.

SUMMARY

Embodiments provide a robot cleaner.

In one embodiment, a robot cleaner includes: a main body; a moving device to move the main body; and a control unit at the main body to recognize an area requiring cleaning, wherein, when the control unit recognizes the area requiring cleaning in a standby state of the robot cleaner, the control unit controls the moving device so that the main body moves from a standby position to the area requiring cleaning to clean the area based on the control unit recognizing the area requiring cleaning.

In another embodiment, a robot cleaner includes: a main body; a moving device to move the main body; and a control unit at the main body to recognize a cleaning restriction area, wherein when the control unit recognizes an area requiring cleaning while in a standby state of the robot cleaner, the control unit controls the moving device such that the main body cleans the area requiring cleaning based on the control unit recognizing the area requiring cleaning except for the cleaning restriction area.

In further another embodiment, a robot cleaner includes: a main body; a moving device to move the main body; a communication unit at the main body to receive information from an external detection device; and a control unit at the main body, the control unit being connected to the communication unit, wherein the control unit controls an operation of the moving device for moving the main body within a cleaning target area on the basis of the information received from the external detection device.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
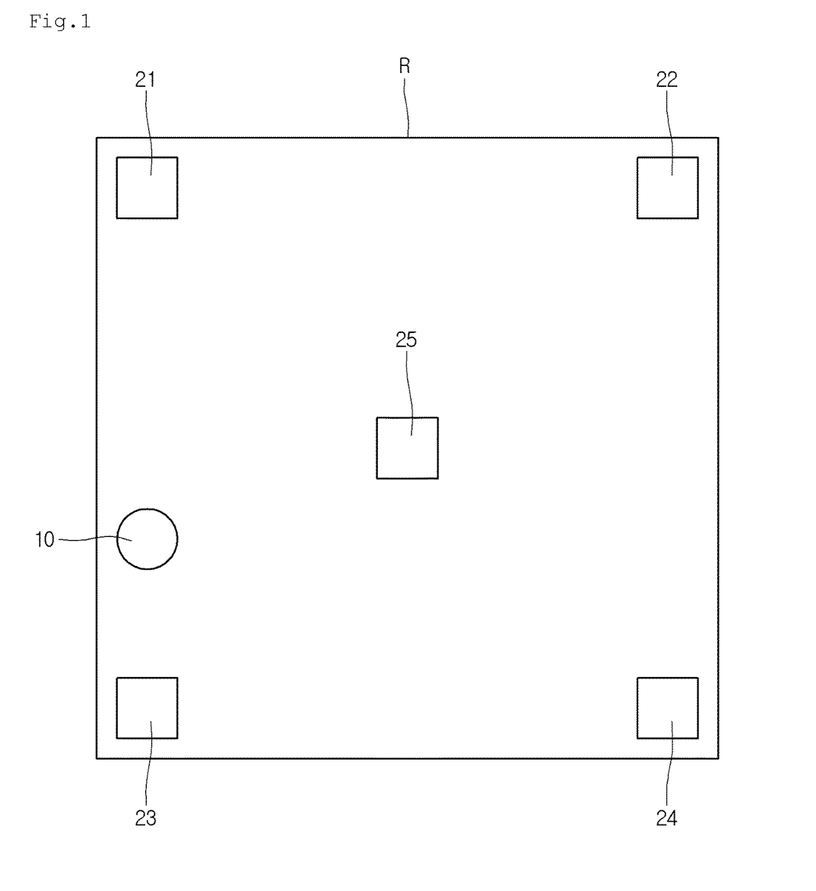
FIG. 1 is a view illustrating an arrangement of an intelligent robot cleaning system according to an embodiment.
Figure 2:
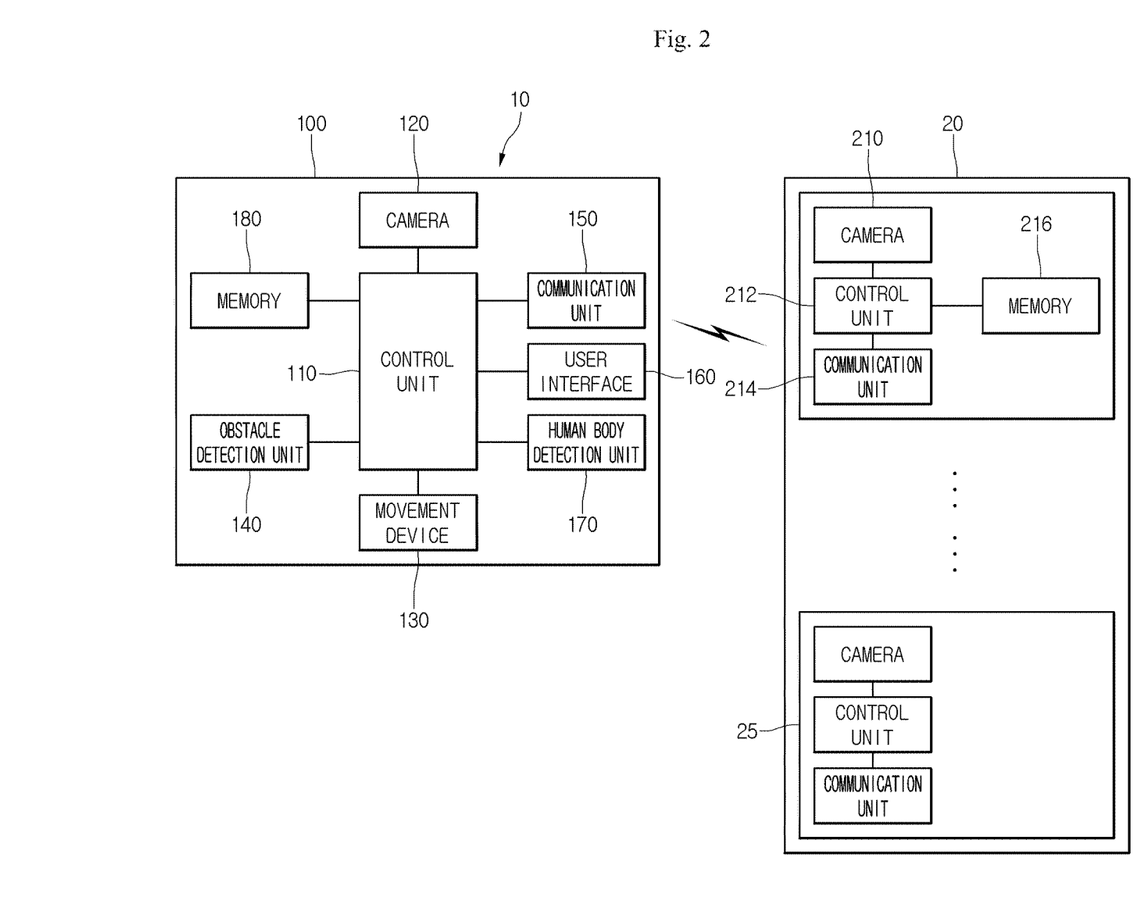
FIG. 2 is a block diagram illustrating a constitution of the intelligent robot cleaning system of FIG. 1.

FIG. 1 is a view illustrating an arrangement of an intelligent robot cleaning system according to an embodiment, and FIG. 2 is a block diagram illustrating a constitution of the intelligent robot cleaning system of FIG. 1.

Referring to FIGS. 1 and 2, an intelligent robot cleaning system according to an embodiment may include a robot cleaner 10 that is capable of performing cleaning in a predetermined space (hereinafter, referred to as a "room R") and a detection device 20 for detecting situations in the room R.

Here, the room R may include a room R defined as one space or a plurality of partitioned spaces.

The robot cleaner 10 includes a main body 100 defining an outer appearance, a movement device 130 for moving the main body 100, and a control unit 110 for controlling the moving device 130.

Although not shown, the robot cleaner 10 may include a suction motor for generating a suction force, a cleaning member for cleaning, and a dust box in which dust is stored.

The movement device 130 includes a plurality of wheels and a plurality of driving motors for respectively driving the plurality of wheels. The control unit 110 may separately control the plurality of driving motors. Each of the plurality of driving motors may be a bidirectionally rotatable motor. Thus, the robot cleaner 10 may move forward, backward, and rotate for a change of direction according to independent driving of each of the plurality of driving motors.

The robot cleaner 10 may include an obstacle detection unit 140 for detecting an obstacle while traveling.

The obstacle detection unit 140 may include at least one sensor. Here, the present disclosure is not limited to a kind of sensor such as an infrared sensor, an ultrasonic wave sensor, and any sensor may be used to achieve a desired result.

The robot cleaner 10 includes a camera 120 for acquiring a surrounding image of the main body 100. The control unit 110 of the robot cleaner 10 may generate a map for a cleaning target area on the basis of the image acquired by the camera 120 and information acquired by the obstacle detection unit 140. The generated map may be stored in a memory 180.

The robot cleaner 10 may photograph the room R by using the camera 120 while traveling to acquire an image.

The robot cleaner 10 may further include a human body detection unit 170. For example, the human body detection unit 170 may be an infrared sensor.

The control unit 110 may recognize existence and status of a person within the image information on the basis of the image information acquired by the camera 120 and information acquired by the human body detection unit 170.

Alternatively, the control unit 110 may recognize the existence and status of the person on the basis of only the image acquired by the camera 120. In this case, an outline of the person may be extracted within the image acquired by the camera 120 to determine the existence and status of the person.

However, when the control unit 110 can recognize the existence and status of the person by using the image information acquired by the camera 120, the human body detection unit 170 may be omitted. However, when the human body detection unit 170 is used together, the control unit 110 may more precisely recognize the existence and the status of the person.

Alternatively, the control unit 110 may recognize the existence and the status of the person by using only the human body detection unit 170.

Thus, in the present disclosure, the camera and the human body detection unit may be called a human body detection mechanism. The human body detection mechanism may be disposed in the main body.

The robot cleaner 10 may further include a communication unit 150 for communicating with the detection device 20. The communication unit 150 may communicate with the detection device 20 by using a Zigbee module, a Wi-Fi module, or a Bluetooth module. However, the current embodiment is not limited to the above communication methods between the communication unit 150 and the detection device 20 and other communication methods may be used to achieve a desired result.

The robot cleaner 10 may further include a user interface 160. The user interface 160 may receive a cleaning command, a traveling mode, or a cleaning reservation command or display information related with the cleaning or information of battery residual power. The cleaning-related information may include cleaning completion information and a time taken to perform the cleaning until the cleaning is completed.

The detection device 20 may be disposed on a wall defining the room R or a ceiling of the room R.

The detection device 20 may include one or more detection units 21 to 25 for acquiring an image obtained by photographing the room R. In the current embodiment, the number of the detection units 21 to 25 is not limited. For example the number of the detection units 21 to 25 may change according to a size or a plane shape of the room R. For example, in FIG. 1, five detection units are disposed in the room R.

Each of the detection units 21 to 25 includes a camera 210 for acquiring an image of the room R, a communication unit 214 for communicating between the detection units 21 to 25, and a control unit 212 connected to the camera 210 and the communication unit 214.

One of the plurality of detection units 21 to 25 may be a master detection unit 21, and others 22 to 25 may be slave detection units. The master detection unit 21 may include a memory 216 for storing the image information acquired by each of the detection units 21 to 25.

Also, the communication unit 214 of the master detection unit 21 may communicate with the communication unit 150 of the robot cleaner 10. The communication unit 214 of the master detection unit 21 may include one communication module or a plurality of communication modules.

For example, the communication unit 214 of the master detection unit 21 may wirelessly communicate with the communication unit 150 of the robot cleaner 10. Also, the communication unit 214 of the master detection unit 21 may wiredly or wirelessly communicate with the communication unit of the slave detection units 22 to 24.

First reference image information of the room R that is in the cleaned state after the cleaning is completed may be stored in the memory 216 of the master detection unit 21. The first reference image information may be image information in which the image information acquired by each of the detection units 21 to 25 is reflected.

The control unit 212 of the master detection unit 21 may compare the image information acquired by each of the detection unit 21 to 25 with the first reference image information stored in the memory 216 to recognize an area where the cleaning is required (hereinafter, referred to as "an area requiring cleaning).

Figure 3:
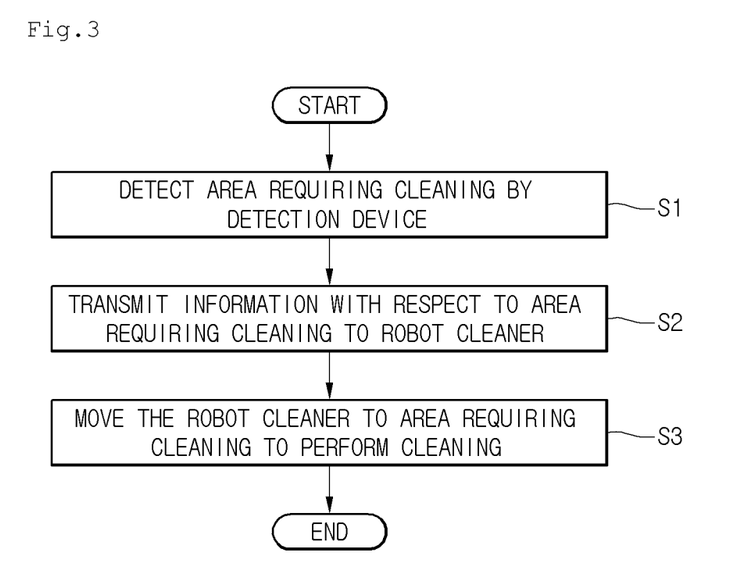
FIG. 3 is a flowchart illustrating a process in which the robot cleaner moves to an area requiring cleaning to clean the area from a standby state according to an embodiment.
Figure 4:
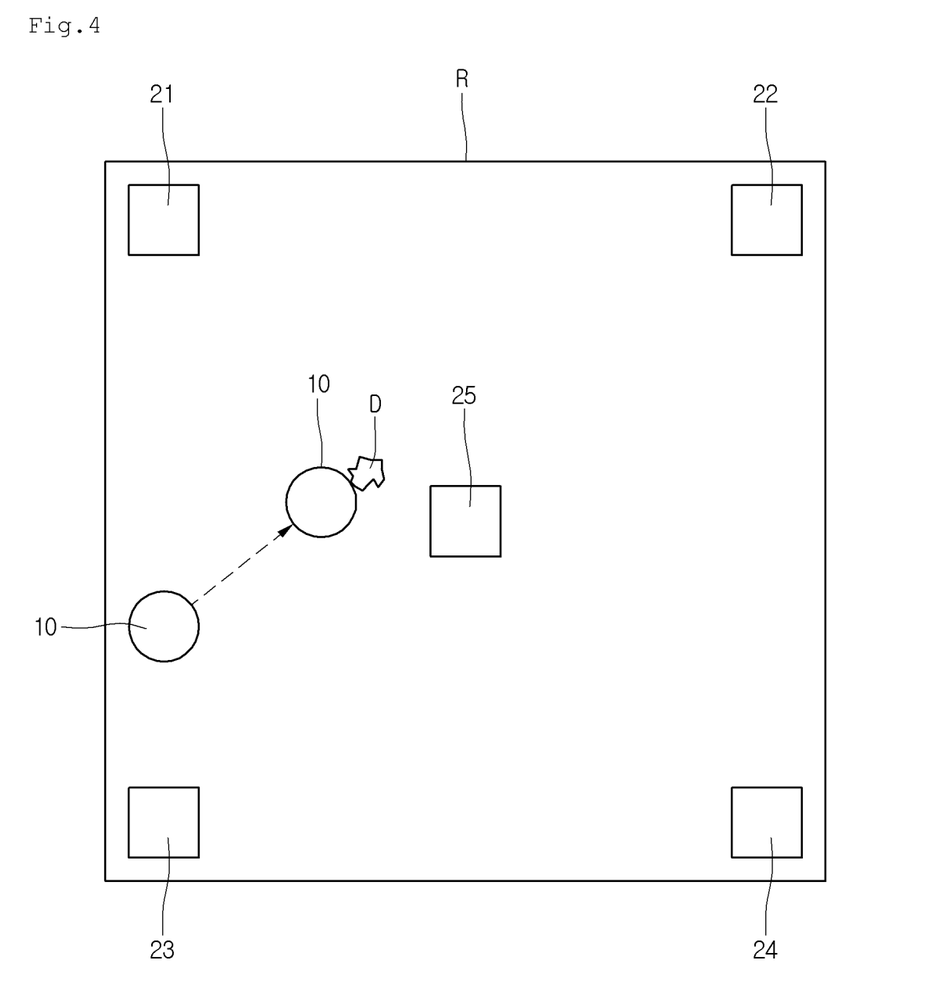
FIG. 4 is a view illustrating the process in which the robot cleaner moves to the area requiring cleaning to clean the area from the standby state according to an embodiment.

FIG. 3 is a flowchart illustrating a process in which the robot cleaner moves to an area requiring cleaning to clean the area from a standby state according to an embodiment, and FIG. 4 is a view illustrating the process in which the robot cleaner moves to the area requiring cleaning to clean the area from the standby state according to an embodiment.

Referring to FIGS. 3 and 4, the robot cleaner 10 may move to a standby position to stand by when the cleaning is completed. Here, the robot cleaner 10 may return to a charging station (not shown) to wait for a cleaning command input. For example, the robot cleaner 10 may move to the standby position that is set by the user when the cleaning is completed to wait for the cleaning command input.

In operation S1, the detection device 20 detects an area requiring cleaning in a standby state of the robot cleaner 10.

Each of the detection units 21 to 25 may intermittently acquire an image of the room R. The control unit 212 of the master detection unit 21 may compare first reference image information stored in the memory 216 with the image information acquired by each of the detection units 21 to 25 to determine and recognize whether the area requiring cleaning exists. For example, the first reference image information is image information when the room R is in the clean state.

For example, when information with respect to dust or foreign substances exist in the image information acquired by each of the detection units 21 to 25, the acquired image information may be different from the first reference image information. Due to the difference between the acquired image information and the first reference image information, the control unit 212 of the master detection unit 212 may determine whether the area requiring cleaning exists.

In operation S2, the detection device 20 may recognize that the area requires cleaning and transmits area requiring cleaning information to the robot cleaner 10. That is, the communication unit 150 of the robot cleaner 10 may receive the area requiring cleaning information from the detection device 20, and the control unit 110 may recognize that the area requires cleaning.

For example, the area requiring cleaning information may be image information including the area that requires cleaning. In detail, the detection device 20 may transmit individual image information acquired by each of the detection units 21 to 25 or single image information in which the individual image information acquired by each of the detection units 21 to 25 are reflected to the robot cleaner 10.

Then, the robot cleaner 10 may use map information stored in the memory 180 and the individual image information received from the detection device 20 or the single image information to recognize coordinate information of the area requiring cleaning on the map.

In another example, the area requiring cleaning information may be the coordinate information of the area requiring cleaning.

In detail, the map information of the room R may be stored in the memory 216 of the master detection unit 21. The control unit 212 of the master detection unit 21 may use the map information of the room R and the individual image information or the single image information to recognize the coordinate of the area requiring cleaning on the map. Also, the detection device 20 may transmit the recognized coordination information to the robot cleaner 10.

In operation S3, the robot cleaner 10 moves to the area requiring cleaning D to perform the cleaning as illustrated in FIG. 4 after the robot cleaner 10 receives the area requiring cleaning information from the detection device 20. Also, after the robot cleaner 10 completely cleans the area requiring cleaning D, the robot cleaner 10 returns again to the standby position. Also, the robot cleaner 10 may transmit cleaning completion notification information to the detection device 20.

According to the current embodiment, since the robot cleaner performs the cleaning without user's command and moves to the area requiring cleaning to perform the cleaning when the area requiring cleaning exists even in the standby state, the room R may be maintained in a clean state.

Also, since the cleaning is rapidly performed on the area requiring cleaning, the area requiring cleaning may be perfectly cleaned when water or beverage is spilled on the floor. That is, it may prevent stain from remaining after the area requiring cleaning is cleaned.

Although the plurality of detection units are divided into the master detection unit and the slave detection units, and the control unit of the master detection unit detects the area requiring cleaning, the current embodiment will not be limited thereto. For example, the detection device may further include a separate main controller communicating with the plurality of detection units, and the main controller may recognize the area requiring cleaning.

Also, although the detection device 20 detects the area requiring cleaning to transmit the area requiring cleaning information to the robot cleaner in the foregoing embodiment, it is not limited thereto. For example, the robot cleaner 10 may directly detect the area requiring cleaning.

That is, the camera 120 of the robot cleaner 10 may be intermittently turned on to acquire the surrounding image of the robot cleaner 10 in the state where the robot cleaner 10 is positioned at the standby position.

Also, the control unit 110 of the robot cleaner 10 may use the image information acquired by the camera 120 and the first reference image information stored in the memory 180 to recognize the area requiring cleaning. Here, the first reference image information may be image information acquired by the camera 120 at the standby position of the robot cleaner 10 in the state where the cleaning is completed.

Then, the robot cleaner 10 may recognize the coordinate of the area requiring cleaning on the map and then move to the area requiring cleaning by itself to perform the cleaning.

Figure 5:
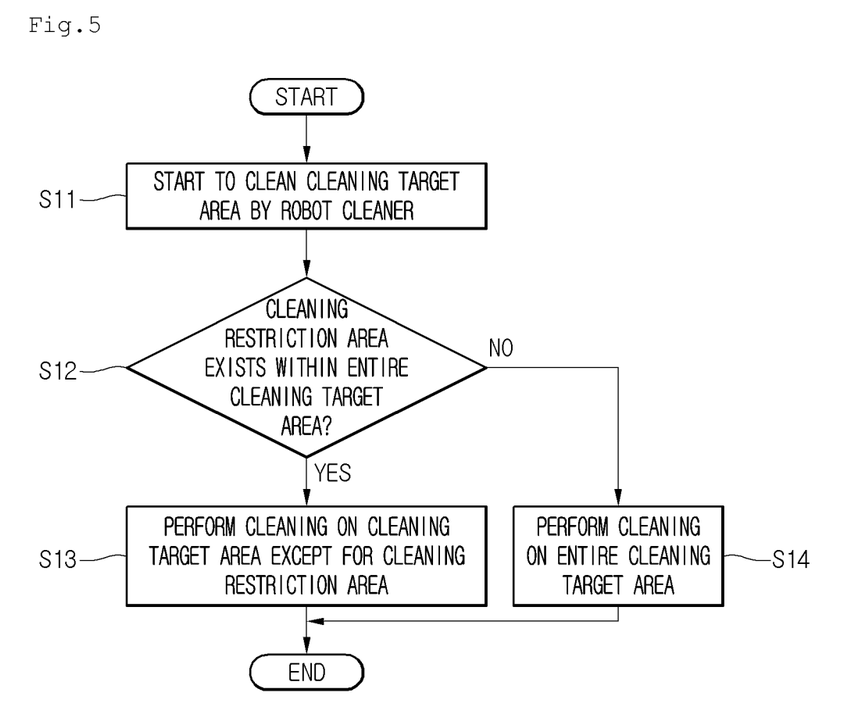
FIG. 5 is a flowchart illustrating a method of controlling the robot cleaner while performing cleaning according to an embodiment.
Figure 6:
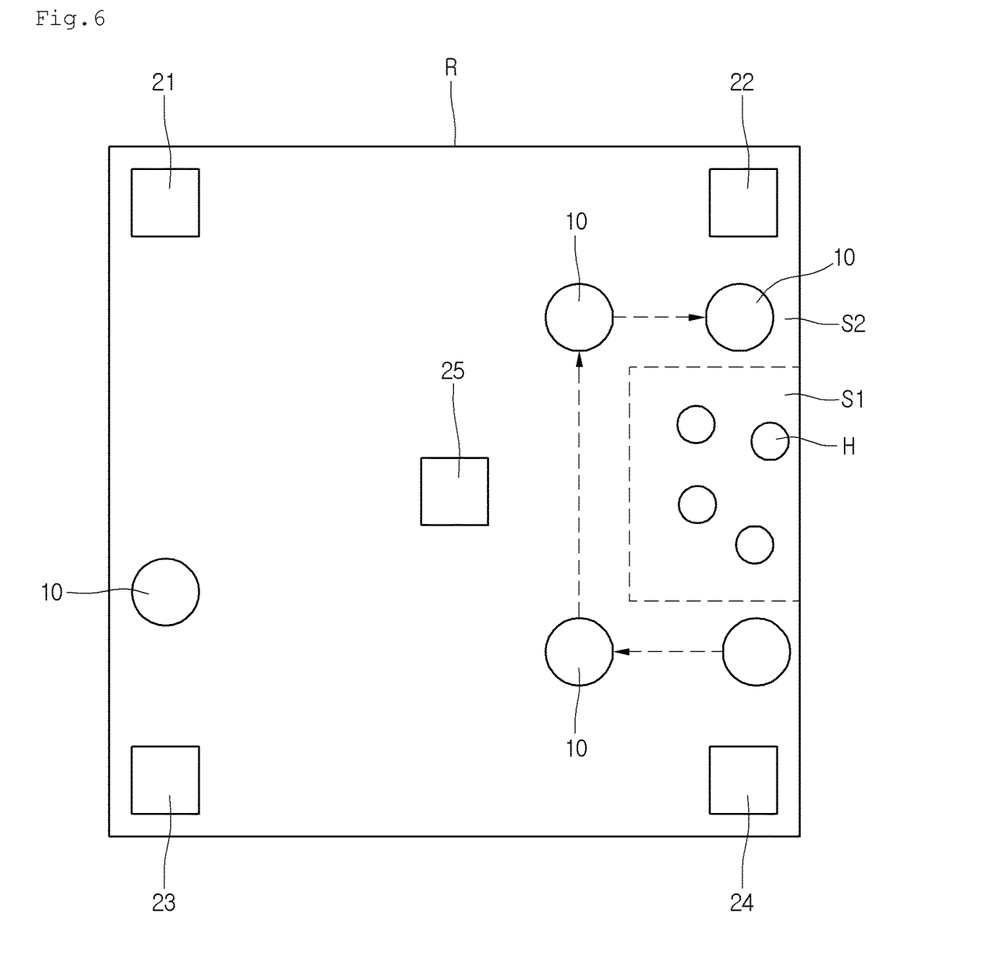
FIG. 6 is a view illustrating a traveling process of the robot cleaner while performing the cleaning according to an embodiment.

FIG. 5 is a flowchart illustrating a method of controlling the robot cleaner while performing cleaning according to an embodiment and FIG. 6 is a view illustrating a traveling process of the robot cleaner while performing the cleaning according to an embodiment.

Referring to FIGS. 5 and 6, in operation S11, when the cleaning command is inputted into the user interface 160, the robot cleaner 10 starts to clean the room R.

When the robot cleaner 10 starts to clean the room R, the robot cleaner 10 may perform the cleaning on the entire cleaning target area on the map while traveling at a preset traveling mode. The control unit 110 of the robot cleaner 10 may recognize whether the present position corresponds to a cleaning completion area or a cleaning non-completion area while the robot cleaner 10 is traveling.

In operation S12, the robot cleaner 10 may determine whether a cleaning restriction area exists in the entire cleaning target area while the robot cleaner 10 is traveling.

The human body detection unit 170 is turned on while the robot cleaner 10 is traveling. Also, the control unit 110 of the robot cleaner 10 may determine the existence, number, movement, and position of person or persons on the basis of the image information acquired by the camera 120 and the information detected by the human body detection unit 170.

In the current embodiment, the existence, number, movement, and position of the person or persons are basic information for determining the cleaning restriction area.

For example, the control unit 110 may recognize the existence, movement, and number of persons H by using the information acquired by the human body detection unit 170. Also, the control unit 110 may recognize a position of the persons H in the image information.

For example, the control unit 110 may recognize that a person is at a standstill without moving in a certain area of the room R by using basic information detected by the human body detection unit 170 and the camera 120. For example, this case may be a case where the person is sleeping or is sitting for a specific work or eating.

Also, the control unit 110 may recognize that persons exist in a predetermined area. For example, the persons may be in the meeting in a specific space or room.

In any case, the persons should not be disturbed by noises generated from the robot cleaner 10.

Thus, the control unit 110 of the robot cleaner 10 recognizes existence of the cleaning restriction area on the basis of the recognized basic information to set a cleaning restriction area S1 in the entire cleaning target area S2 on the map. For example, a virtual area including an area where a person or persons exist may be partitioned by a virtual wall (a dotted line defining the cleaning restriction area S1 from the cleaning target area S2 in FIG. 6) to set the cleaning restriction area S1.

In operation S13, according to the result determined in the operation of S13, if it is determined that the cleaning restriction area S1 exists in the entire cleaning target area, the robot cleaner 10 may perform the cleaning while traveling an area except for the cleaning restriction area (the virtual wall). On the other hand, in operation S 14, if it is determined that the cleaning restriction area does not exist, the robot cleaner 10 may perform the cleaning while traveling the entire cleaning target area.

According to the proposed embodiment, since the robot cleaner detects the conditions disturbed by the noises of the robot cleaner, for example, a situation in which the person is sleeping or is in the meeting, by setting the cleaning restriction area, thereby performing the cleaning on an area outside of the cleaning restriction area, the person may have a less influence on the noises generated when the robot cleaner is traveling.

For another example, the robot cleaner 10 may not set the cleaning restriction area, but receive the cleaning restriction area information from the outside. Then, the robot cleaner 10 may set the cleaning restriction area.

For another example, when a proportion of the cleaning restriction area to the entire cleaning target area is greater than a reference proportion in a state where the robot cleaner 10 recognizes the cleaning restriction area while cleaning, the robot cleaner may stop the cleaning to return to the standby position.

Also, the cleaning reservation may be preset through the user interface 160. The robot cleaner 10 may recognize the cleaning restriction area by itself or receive the information about the cleaning restriction area in the standby state before reaching a preset cleaning start time. In this case, even though it reaches the preset cleaning start time, the robot cleaner may be maintained in the standby state without starting the cleaning.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
a main body;
a moving device to move the main body;
a control unit at the main body to recognize an area requiring cleaning;
a camera at the main body to take an image in a vicinity of the main body; and
a memory in which reference image information acquired by taking an image in the vicinity of the main body when the area is clean, and map information are stored,
wherein, when the control unit recognizes the area requiring cleaning while in a standby state of the robot cleaner, the control unit controls the moving device so that the main body moves from a standby position to the area requiring cleaning to clean the area based on the control unit recognizing the area requiring cleaning, and
wherein the control unit recognizes the area requiring cleaning by using the reference image information stored in the memory and image information related to an image subsequently taken by the camera, and
recognizes coordinate information of the area requiring cleaning from the map information.

2. The robot cleaner according to claim 1, wherein, when the control unit recognizes the area requiring cleaning, the control unit controls the moving device so that the main body moves to the area requiring cleaning without receiving a cleaning command.

3. The robot cleaner according to claim 2, further comprising a communication unit at the main body to communicate with an external detection device,
wherein the control unit recognizes the area requiring cleaning when the communication unit receives information related to the area requiring cleaning from the external detection device.

4. The robot cleaner according to claim 3,
wherein the communication unit receives the image information including information related to the area requiring cleaning from the external detection device, and
the control unit uses the received image information and the map information stored in the memory to recognize a coordinate of the area requiring cleaning.

5. The robot cleaner according to claim 3, wherein the communication unit receives the coordinate information of the area requiring cleaning from the external detection device.

6. The robot cleaner according to claim 1, wherein the control unit controls the camera so that the camera intermittently or continuously takes an image while in the standby state of the robot cleaner.

7. The robot cleaner according to claim 1, wherein when, the cleaning is completed on the area requiring cleaning, the control unit controls the moving device so that the main body moves to the standby position.

8. A robot cleaner comprising:
a main body;
a moving device to move the main body; and
a control unit at the main body to recognize a cleaning restriction area,
wherein when the control unit recognizes an area requiring cleaning while in a standby state of the robot cleaner, the control unit controls the moving device such that the main body cleans the area requiring cleaning based on the control unit recognizing the area requiring cleaning except for the cleaning restriction area, and
when a proportion of the cleaning restriction area to an entire cleaning target area is greater than a reference proportion, the control unit controls the robot cleaner to stop the cleaning and to return to a standby position.

9. The robot cleaner according to claim 8, wherein the control unit recognizes the cleaning restriction area while the main body is traveling.

10. The robot cleaner according to claim 8, further comprising a human body detection mechanism at the main body to detect a human body, wherein the control unit recognizes the cleaning restriction area by using information acquired from the human body detection mechanism.

11. The robot cleaner according to claim 10, wherein the human body detection mechanism comprises at least one of a camera and an infrared sensor.

12. The robot cleaner according to claim 10, further comprising a memory at the main body to store map information, wherein the control unit partitions a virtual area comprising an area where a person detected by the human body detection mechanism exists on a map with a virtual wall to set an area in the virtual wall as the cleaning restriction area.

13. The robot cleaner according to claim 8, further comprising a communication unit at the main body to communicate with an external detection device, wherein the control unit recognizes the cleaning restriction area when the communication unit receives information of the cleaning restriction area from the external detection device.

14. A robot cleaner comprising:

a main body;

a moving device to move the main body;

a control unit at the main body to recognize an area requiring cleaning;

a communication unit at the main body to communicate with an external detection device; and a memory at the main body to store map information, wherein, when the control unit recognizes the area requiring cleaning while in a standby state of the robot cleaner, the control unit controls the moving device so that the main body moves from a standby position to the area requiring cleaning to clean the area based on the control unit recognizing the area requiring cleaning, and wherein the communication unit receives image information including information related to the area requiring cleaning from the external detection device, and the control unit uses the received image information and the map information stored in the memory to recognize a coordinate of the area requiring cleaning.

\* \* \* \* \*